United States Patent
Maekawa (10) Patent No.: US 7,669,480 B2
(45) Date of Patent: Mar. 2, 2010

(54) SENSOR ELEMENT, SENSOR DEVICE, OBJECT MOVEMENT CONTROL DEVICE, OBJECT JUDGMENT DEVICE

(75) Inventor: Satoshi Maekawa, Tokyo (JP)

(73) Assignee: National Institute of Information and Communications Technology, Incorporated (JP)

( * ) Notice: Subject to any disclaimer, the term of this patent is extended or adjusted under 35 U.S.C. 154(b) by 142 days.

(21) Appl. No.: 11/886,956

(22) PCT Filed: Mar. 27, 2006

(86) PCT No.: PCT/JP2006/306102

§ 371 (c)(1),
(2), (4) Date: Sep. 21, 2007

(87) PCT Pub. No.: WO2006/106612

PCT Pub. Date: Oct. 12, 2006

(65) Prior Publication Data

US 2009/0044639 A1 Feb. 19, 2009

(30) Foreign Application Priority Data

Mar. 30, 2005 (JP) .............................. 2005-099828

(51) Int. Cl.
*G01B 7/16* (2006.01)
(52) U.S. Cl. ...................................................... 73/777
(58) Field of Classification Search ..................... 73/777
See application file for complete search history.

(56) References Cited

U.S. PATENT DOCUMENTS

| 4,786,887 A * | 11/1988 | Bringmann et al. ............ 338/2 |
| 5,068,635 A * | 11/1991 | Yajima ........................ 338/42 |
| 6,344,791 B1 * | 2/2002 | Armstrong ................... 338/114 |
| 7,064,561 B2 * | 6/2006 | Morimoto .................... 324/691 |
| 7,082,838 B2 * | 8/2006 | Rowe et al. .................... 73/777 |
| 7,123,028 B2 * | 10/2006 | Okada et al. ................. 324/681 |
| 7,174,793 B2 * | 2/2007 | Morimoto .............. 73/862.045 |
| 7,255,011 B2 * | 8/2007 | Morimoto ..................... 73/781 |

FOREIGN PATENT DOCUMENTS

| EP | 1365221 A1 | 11/2003 |
| JP | 5-58675 B2 | 8/1993 |

(Continued)

OTHER PUBLICATIONS

T-2000 "Adaptable array tactile sensor" SysCom, Inc. Nov. 27, 2002.

(Continued)

*Primary Examiner*—Lisa M Caputo
*Assistant Examiner*—Octavia Davis
(74) *Attorney, Agent, or Firm*—Banner & Witcoff, Ltd.

(57) ABSTRACT

A sensor element capable of appropriately detecting an external force operating three-dimensionally is provided. The sensor element includes an elastic member which can be compressed or expanded by an external force received from an object, a resistance element whose electric resistance value rises or falls when deformed by the external force, and a support member arranged inside or on the surface of the elastic member and capable of supporting the resistance element disposed at a predetermined position. The sensor element is applied to an object movement control device and an object judgment device.

13 Claims, 10 Drawing Sheets

FOREIGN PATENT DOCUMENTS

JP          7-52130 B2     6/1995

OTHER PUBLICATIONS

"Inastomer", Inaba Rubber, Inc. Oct. 17, 2002.
"Micro tactile sensor catheter research", Olympus Optical, Inc., Dec. 1, 1999.
"Torao research themes", Shinoda Labs, Department of Computer Science, Graduate School of Information Science and Engineering, Tokyo Institute of Technology, Nov. 26, 2002.
"Distribute tactile sensor for control of grasping force", Maeno Laboratory, Department of Mechanical Engineering, Keio University, Oct. 17, 2002.

* cited by examiner

SENSOR ELEMENT, SENSOR DEVICE, OBJECT MOVEMENT CONTROL DEVICE, OBJECT JUDGMENT DEVICE

CROSS REFERENCE TO RELATED APPLICATIONS

This application is a National Stage application of co-pending PCT application PCT/JP2006/306102 filed Mar. 27, 2006, which claims the benefit of Japanese application number 2005-099828 filed Mar. 30, 2005. These applications are incorporated herein by reference in their entireties.

BACKGROUND OF THE INVENTION

The present invention relates to sensor elements for mounting on the fingertips of a robot hand or an artificial hand or the like in order to provide fine power adjustments that are required when grasp control operations or the like are performed, and to object movement control devices for controlling movement of objects and object judgment devices for discriminating objects, both of the aforementioned devices incorporating the sensor elements mounted on the fingertips of a robot hand or the like.

In recent years, research and development of multi-finger robot hands resembling human hands, and artificial hands has been undertaken with one of two objectives: the first, to provide robot hands or artificial hands capable of being used to perform operations on behalf of humans in places in places where it is difficult or potentially hazardous for humans to undertake the operations directly, such as operations performed in outer space and deep sea exploration, and operations in which an explosion may occur; the second, to provide prosthetic hands for people with physical disabilities in order to compensate for impeded functionality of their hands.

Further, in order to realize a level of operational dexterity more closely approaching that of the human hand, sensor elements for mounting on the fingertips of a robot hand, an artificial hand or the like, and which are capable of realizing the level of fine power adjustment required for grasp control have been developed and placed on the market.

Sensor devices such as those described above are known in which the control of grasping force is facilitated by detecting the amount of pressure applied to the sensor element. For example, Non-patent Reference No. 1 describes a capacitance pressure sensor device configured to facilitate control of the grasping force applied to the sensor element by measuring the capacitance between a pair of electrodes provided on a capacitance pressure sensor element. Non-patent Reference No. 2 describes an example of a pressure sensitive conductive elastomer sensor device configured to facilitate control of grasping force by measuring the amount of pressure applied to a pressure sensitive elastomer sensor element by detecting changes in the resistance between a pair of electrodes between which a pressure sensitive electrically conductive rubber has been inserted.

Further, sensor devices are also known in which the control of grasping force is facilitated by detecting contact between the sensor device and an object of grasping. For example, Non-patent Reference No. 3 describes a micro-pressure sensor device, which is provided with a vibrating tactile sensor disposed on the sensor device so as to be able to come into contact with an object of grasping, configured to facilitate control of grasping force through detecting contact with an object of grasping by measuring the viscoelastic property shown by changes in the magnitude and frequency of the vibrations when the vibrating tactile sensor has come into contact with the object of grasping.

Still further, Non-patent Reference No. 4 describes an example of a resonance tensor cell tactile sensor device that utilizes the ultra sound resonance phenomenon to detect changes in the dimensions of a spherical cavity provided within an elastic body so as to detect pressure applied to the elastic body so as to facilitate control of the grasping force. Further still, Non-patent Reference No. 5 describes an example of a distributed contact sensor device configured to facilitate control of the grasping force by use of a contacting surface slippage sensor element provided with a distributed strain gauge capable of detecting local slippage occurring between an object of grasping and the sensor element.

Non-patent Reference 1: "T-2000 Adaptable array tactile sensor", SysCom, Inc., accessed on Nov. 27, 2002 at http://www.syscom-inc.co.jp/pps_array.pdf Non-patent Reference 2: "Inastomer", Inaba Rubber, Inc., accessed on Nov. 27, 2002 at http://www.inaba-rubber-.co.jp/katarogu/inast/inast.html Non-patent Reference 3: "Micro tactile sensor catheter research", Olympus Optical, Inc., accessed on Nov. 27, 2002 at http://www.oympus.co.jp/Special/OTF80/mskt.html Non-patent Reference 4: "TORAO research themes", Shinoda Labs, Department of Computer Science, Graduate School of Information Science and Engineering, Tokyo Institute of Technology, accessed on Nov. 27, 2002 at http://www.alab.t-u-tokyo.ac.jp/-shinolab/members/torao/kenkyu/kenkyul.html Non-patent Reference 5: "Distributed tactile sensor for control of grasping force", Maeno Laboratory, Department of Mechanical Engineering, Keio University, accessed on Nov. 27, 2002 at http://www.maeno.mech.keio.ac.jp/sensor2/sensor2.htm

SUMMARY OF THE INVENTION

However, a problem exists with the above-described sensors in that although it is possible to appropriately detect the amount of pressure applied to an object if the pressure is applied from a predetermined direction, it is difficult to identify the direction from which the pressure has been applied if the pressure is applied from a direction other than the predetermined direction.

That is to say, in the case of a capacitance pressure sensor device, if the pressure applied to the sensor device acts in a substantially vertical direction with respect to a pair of electrodes so that the distance therebetween is either reduced or increased, it is possible to appropriately detect the pressure; however, if the pressure is applied in a oblique direction, it is not possible to appropriately detect the pressure, causing a problem wherein it is difficult to control the grasping force.

Further, in the same manner, a problem exists with pressure sensitive conductive elastomer sensor devices wherein it is impossible to control grasping force because there are cases in which the applied pressure cannot be accurately detected depending on the direction from which the pressure has been applied to the pressure sensitive conductive elastic member inserted between a pair of electrodes.

Still further, there are cases in which control of grasping force becomes difficult with a micro-pressure sensor device due to the surface condition of the object of grasping.

Further still, in the case of resonance tensor cell sensor devices, a problem exists in that construction of the distributed sensor is difficult due to the necessity of transmitting and receiving ultra sound waves, whereby it is necessary to make the sensor device large in size in order to enable three-dimensional control of the object of grasping, and difficult to make the sensor device small.

Further, there is a problem in that the sensor portions common to the above-described sensor devices are extremely sensitive and malfunction easily.

It is a main object of the current invention to solve the above-described problems.

That is to say, the sensor element according to the present invention is provided with an elastic member capable of being compressed or expanded by an external force received from an object, a resistance element whose electrical resistance value rises or falls upon the deformation thereof by an external force, and a support member disposed inside or on the surface of the conductive elastic member and capable of supporting the resistance element in a predetermined position.

According to a configuration such as that described above, when an external force is applied in a direction expanding or compressing the sensor element, the resistance value of the resistance element deformed by the external for changes, whereby the force in three directions can be measured simultaneously if the resistance value is measured. Further, at this time, because the support member is supporting the resistance element in a predetermined position, it becomes possible to reduce the occurrence of troubles such as the breakage of the resistance element when an unintentional external force is applied thereto, for example. In other words, it is possible to provide a sensor element with excellent damage resistance and shock resistance capable of accurately measuring an external force three-dimensionally while being protected from the external force.

In order to accurately measure the external force, it is preferable that the support member is provided with a deformable element capable of being deformed by the external force, and that the resistance element is supported on the deformable element. Further, if the support member is a provided with a non-deformable element incapable of being deformed by an external force disposed around the periphery of the deformable element, the resistance element can be securely protected from the external force.

Further, an advantageous of the present invention can be realized if the non-deformable element is an external wall member formed of four-sided level-surfaced substantially in the shape of a substantially rectangular framework, and the deformable element is a beam member spanning the four sides of the external wall member.

Note that in order to appropriately detect an external force applied three-dimensionally, it is preferable that the support member is provided with a protruding member that protrudes in a predetermined direction.

Further, another method for accurately measuring an external force can be proposed in which the resistance element is disposed in the elastic member located adjacent the support member.

Still further, if a plurality of the resistance elements is arranged to form a Wheatstone bridge circuit, the external force can be measured at a high sensitivity with a simple configuration.

On the other hand, a thin, high-performance distributed sensor can be constructed if a plurality of the support members is disposed in the elastic member and the support members are arranged in an array.

An advantageous embodiment of a sensor device according to the present invention that analyzes an external force applied to the sensor element can be realized if the sensor device is provided with the sensor element, an electrical property measuring means for measuring the electrical resistance values of the resistance elements provided on the sensor element, and an external force analyzing means for analyzing external force information related to the magnitude, directionality or the like of the external force, based on the resistance value measured by the electrical property measuring means.

Further, if a form estimating means for estimating the form of the conductive elastic member after the deformation thereof by the external force, based on the resistance value measured by the electrical property measuring means, it is possible to estimate the form of the conductive elastic member deformed by the external force.

Still further, if a three-dimensional display means is provided for displaying three-dimensionally displaying the form of the elastic member estimated by the form estimating means, based on the resistance value, it is possible to more readily know the form of the conductive elastic member.

Further still, if the sensor device according to the present invention is of a configuration comprising an object judging means for discriminating the surface condition or composition of the object, based on the external force information analyzed by the external force analyzing means, and an object judgment data storage means for storing object data representing the surface condition or composition of the object, the object judging means can discriminate the surface condition or composition of the object by referencing the object data stored in the object judgment data storage means, whereby it becomes possible to more readily know the surface condition or composition of the object.

Note that in order to use a sensor element such as that described above in an object movement control device for controlling movement of an object to a desired position, it is desirable that the object movement control device be of a configuration comprising: a contacting means on which the sensor is mounted for making physical contact with the object by way of the sensor element, an electrical property measuring means for measuring the resistance value of the resistance element provided on the sensor element, an external force analyzing means for analyzing the external force information relating to the magnitude, directionality or the like of the external force, based on the resistance value measured by the electrical property measuring means, and a first position controlling means for controlling the three-dimensional position of the contacting means with respect to the object. Here, it is desirable that the contacting means has a form imitating that of the human finger.

Further, in order to use a sensor element such as that described above for discriminating objects, it is preferable that the device be of a configuration wherein the sensor element is mounted on the object judging means, and comprises: a contact means for making physical contact with the object through the sensor element; an electrical property measuring means for measuring the resistance value of the resistance element provided on the sensor element; an external force analyzing means for analyzing the external force information relating to the magnitude, directionality or the like of the external force, based on the resistance value measured by the electrical property measuring means; an object judging means for discriminating the surface condition or composition of the object, based on the external force information analyzed by the external force analyzing means; an object judgment data storage means for storing object data representing the surface condition or composition of the object; and a second position controlling means for causing the sensor element to be in physical contact with the surface of the object while the object judging means discriminates the surface condition or composition of the object, based on the external force information analyzed by the external force analyzing means, when the contacting means is moved.

According to the present invention described above in detail, when an external force is applied in a direction expanding or compressing the sensor element, the resistance value of the resistance element deformed by reception of the external for rises or falls, whereby the force in three directions can be measured simultaneously if the resistance value is measured. Further, at this time, because the support member is supporting the resistance element in a predetermined position, it becomes possible to reduce the occurrence of troubles such as the breakage of the resistance element when an unintentional external force is applied thereto, for example. In other words, it is possible to provide a sensor element with excellent damage resistance and shock resistance capable of accurately measuring an external force three-dimensionally while being protected from the external force.

Further, if the above-described sensor element is used, it becomes possible to realize an object movement control means capable of appropriately controlling the grasping force applied to objects, or an object judging means facilitating appropriate discrimination of the surface condition or composition of an object.

Hereinafter, the preferred embodiments of the present invention will be described in detail with reference to the drawings.

Figure 1:
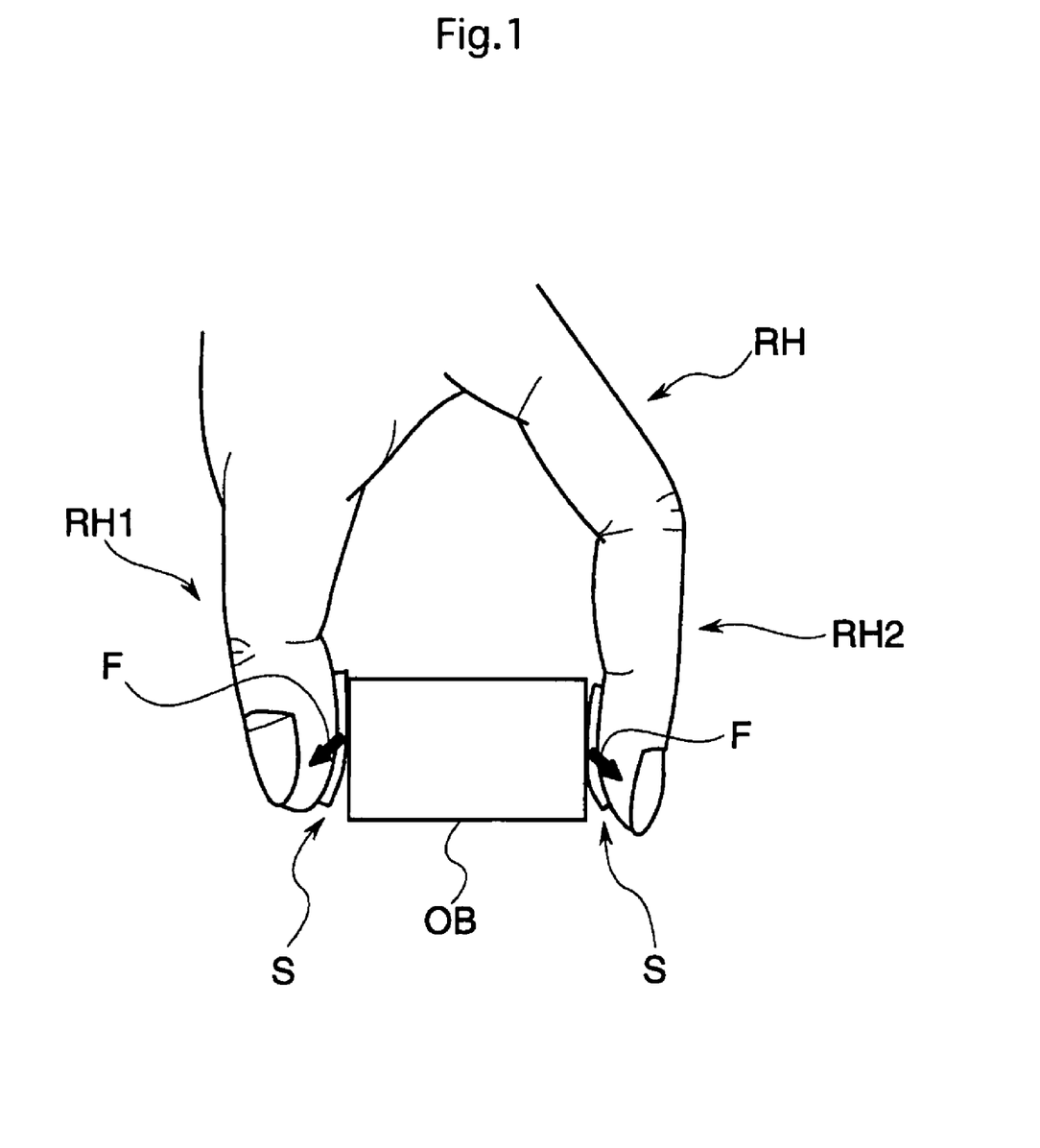
FIG. 1 shows a view of the overall configuration of the sensor device according to an embodiment of the present invention.

As show in FIG. 1, the sensor device P according to the present invention is provided with a robot hand RH serving as a contacting means for making physical contact with an object OB in order to move the object OB, discriminate the surface condition or composition of the object OB, etc, sensor elements S for mounting on the vernal side of the fingertip of each finger of the robot hand RH, and a sensor device main unit P1 (not shown) for measuring and analyzing the changes in an electrical property caused by the application of an external force F to the sensor elements S, and causing the robot hand RH to perform predetermined operations based on the measurement and analysis results.

A detailed description of each part follows. The robot hand RH according to current embodiment has the form of a human finger, and is a robot hand for controlling movement of the object OB to a desired position, based on a control signal received from the sensor device main unit P1.

Figure 2:
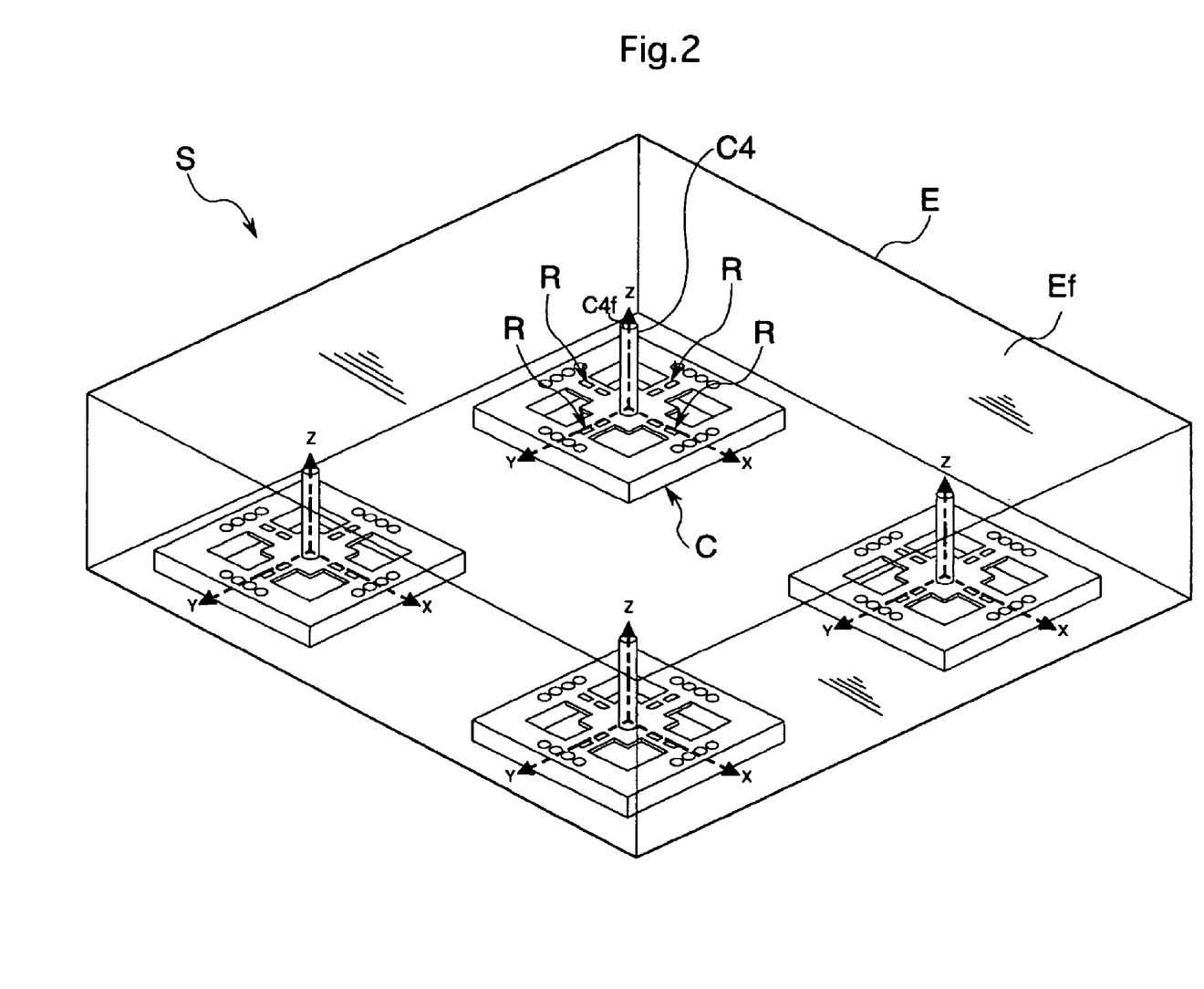
FIG. 2 shows a schematic view illustrating the sensor element according to the same embodiment as that of FIG. 1.

The sensor element S, as shown in FIG. 2, comprises: a thin sheet elastic member E formed in a level-surfaced rectangular shape capable of being expanded or compressed by an external force; a semiconductor resistance element R having a piezo-resistance effect that causes the resistance value to rise or fall upon deformation of the resistance element R by an external force F; and a support member C disposed in a corner portion within the elastic member for protecting the resistance element from the external force F.

Figure 3:
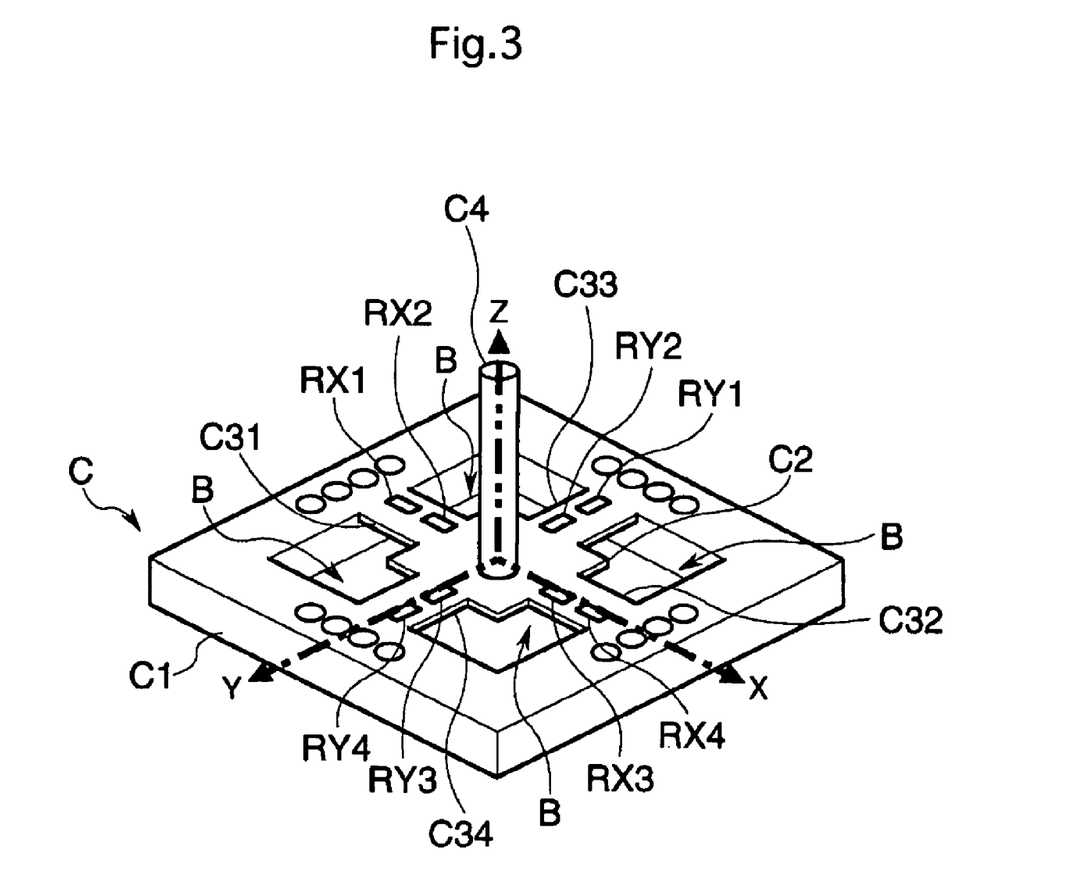
FIG. 3 shows a schematic view illustrating the mounted state of the resistance element according to the same embodiment as that of FIG. 1.

More specifically, as shown in FIG. 3, the support member C comprises: an external wall member C1 formed as a four-sided framework that is a non-deformable element incapable of being deformed by an external force; a central member C2 formed as a level-surfaced rectangular shaped deformable element surrounded by each side of the external wall member C1 and capable of being deformed by an external force; four beam members C31, C32, C33, and C34 (hereinafter collectively referred to as beam members C3) formed as a deformable element capable of being deformed by an external force and extending from substantially the center portion of each side of the external wall member C1 to the central member C2; and a protruding member C4 formed as a column extending upright from substantially the center portion of the central member 2 so that an upper end surface C4f thereof is exposed on a surface Ef4 of the elastic member E. Further, the external wall member C1, the central member C2, and the beams members C3 are formed as an integral unit from a material such as a composite resin or the like having a higher degree of hardness than that of the elastic member E. Continuing, the sensor element is configured such that the support member C formed as described above is considered as one unit, and four such units are arranged within the corner portions of the elastic member E. Note that according to the current embodiment, the protruding member C4 is formed of the same material as that of the central member C2; however, the if a material that has a higher degree of hardness than the elastic member E, such as a metallic material, can be used, the protruding member C4 is not limited to being formed of the same material as that of the central member C2.

Figure 4:
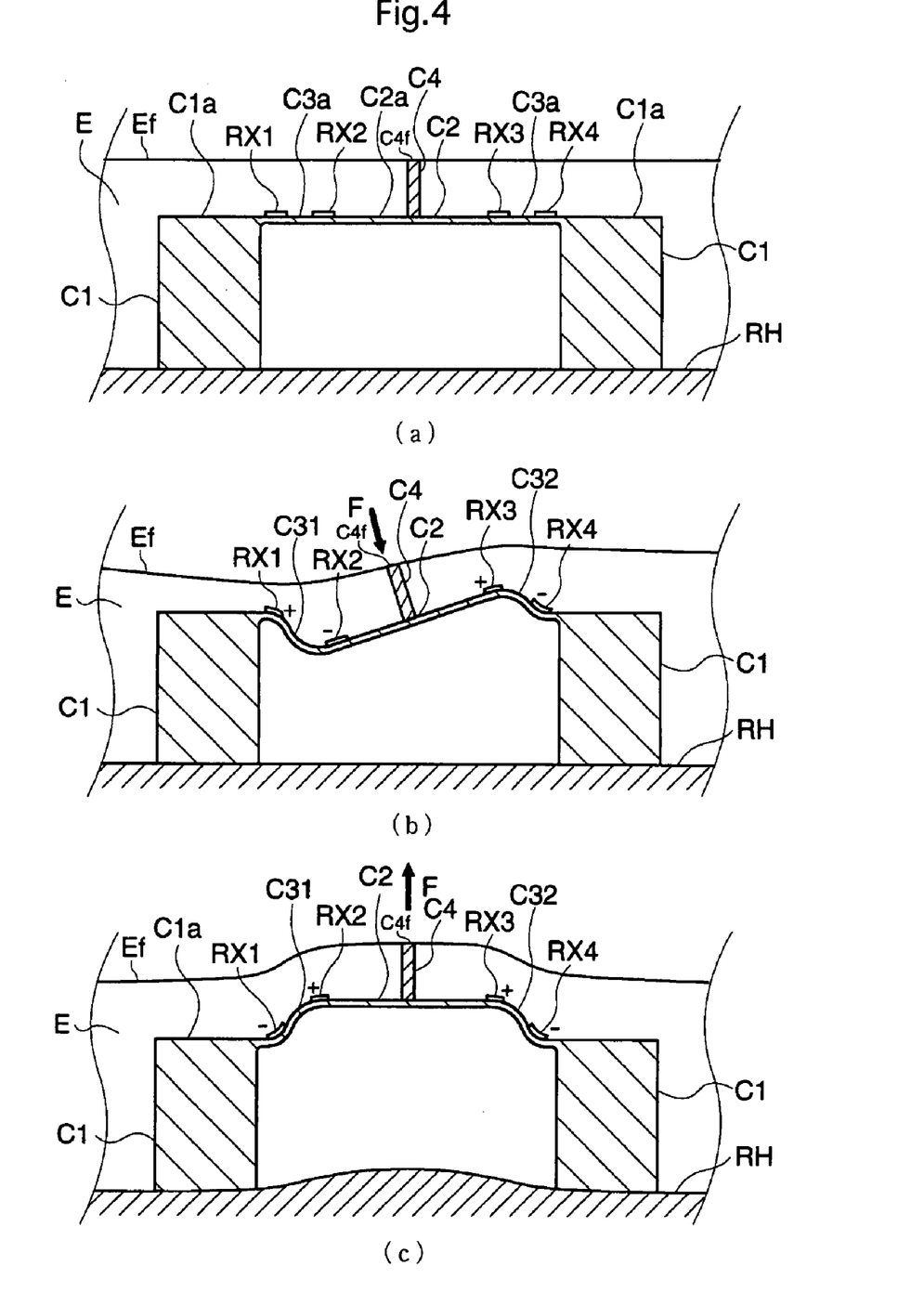
FIG. 4 is a schematic cross-sectional view of the sensor element according to the same embodiment as that of FIG. 1.

Further, when an external force F is applied, as shown in FIG. 4a, in each support member C unit the surfaces C1a, C2a, and C3a of the external wall member C1, the central member C2 and the beam members C3 are configured so as to form substantially a single surface on the side of the support member C opposite that on which the robot hand is mounted.

Still further, as shown in FIG. 3, two each of the resistance elements are disposed on the surfaces C3a of the beam members C3 opposite the robot hand mounting surface. That is to say, resistance elements Rx1 and Rx2 are disposed on the beam element C31, resistance elements Rx3 and Rx4 are disposed on the beam element C32, resistance elements Ry1 and Ry2 are disposed on the beam element C33, and resistance elements Ry3 and Ry4 are disposed on the beam element C34.

Figure 10:
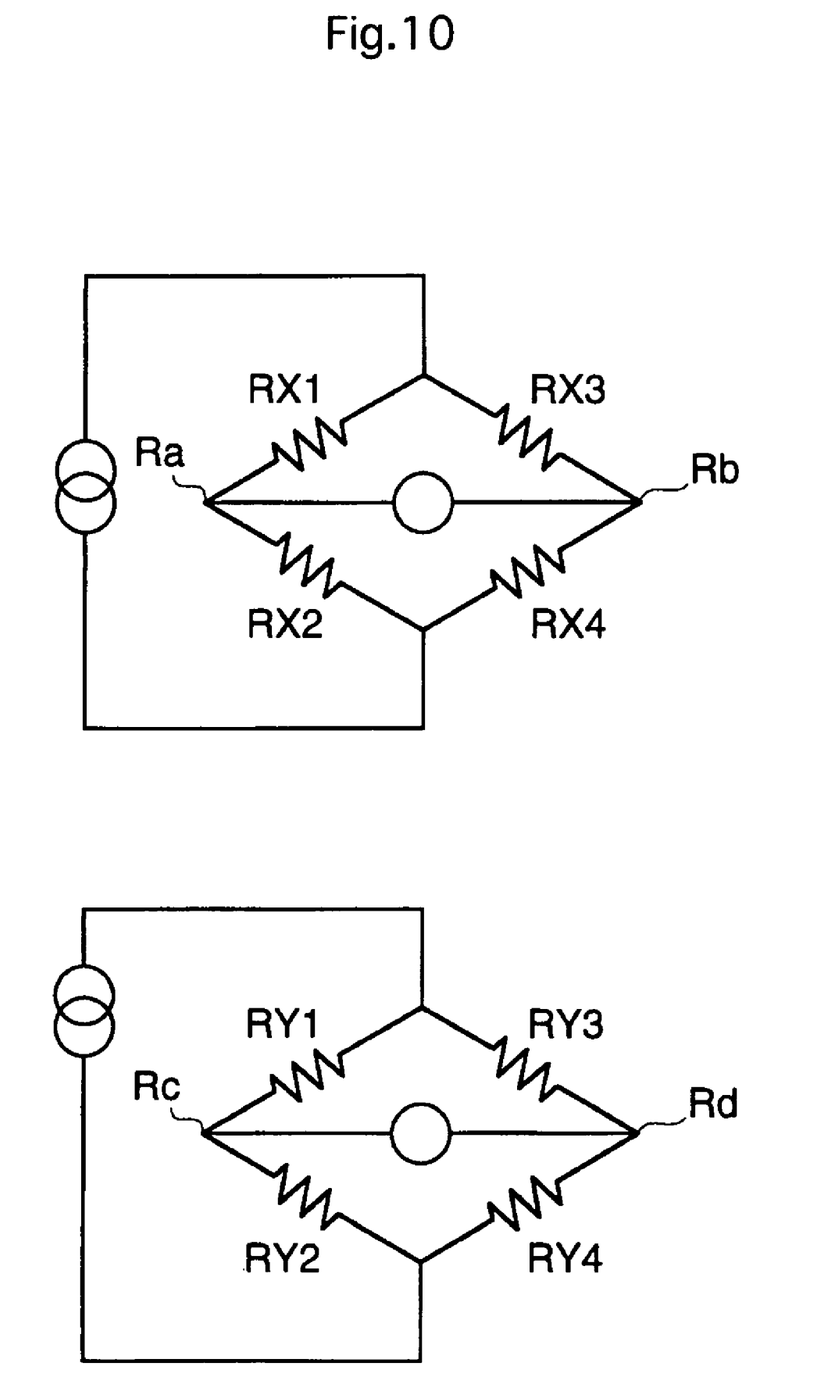
FIG. 10 is a circuit diagram showing the connections of the resistance elements according to the same embodiment as that of FIG. 1.

Continuing, a Wheatstone bridge circuit such as that shown in FIG. 10 is formed by the resistance elements Rx1, Rx2, Rx3 and Rx4, and the resistance elements Ry1, Ry2, Ry3 and Ry4 connected by wires (not shown), whereby it becomes possible to appropriately detect an external applied in the axial directions X, Y, and Z shown in FIG. 3. More specifically, as shown in FIG. 4, for example, when the sensor element S receives an external force F, the protruding member C4 is displaced by the external force F. Further, because the protruding member C4 displaced by the external force F is mounted to the central member C2, the central member C2 also becomes displaced. Still further, the distance between the central member C2 displaced by the external force F and the external wall member C1 not deformed by the external force F changes, and the beam elements C3 suspended between the central member C2 and the external wall member C1 become deformed, resulting in the deformation also of the resistance elements R mounted on the beam members C3. In this manner, the resistance value of the resistance elements Rx1 and Rx3 rises, the resistance value of the resistance elements Rx2 and Rx4 falls.

On the other hand, as shown in FIG. 4b, when the position of the central member 2 is displaced in the direction of movement toward the opposite of that the robot hand mounting side by reception of an external force F, the beam elements C3 are also deformed in conjunction therewith, resulting in the deformation of the resistance elements R mounted on the beam members C3. In this fashion, the resistance value of the resistance elements Rx1 and Rx3 rises, the resistance value of the resistance elements Rx2 and Rx4 falls. When the resistance elements disposed on the beam members C3 are deformed in this way upon the application of an external force F to the elastic member E, the resistance values of the resistance elements R that have received the external force F changes, whereby it becomes possible to analyze the external force F applied to the sensor element S into components of the axial directions X, Y, and Z, based on the changes in the resistance values.

Figure 5:
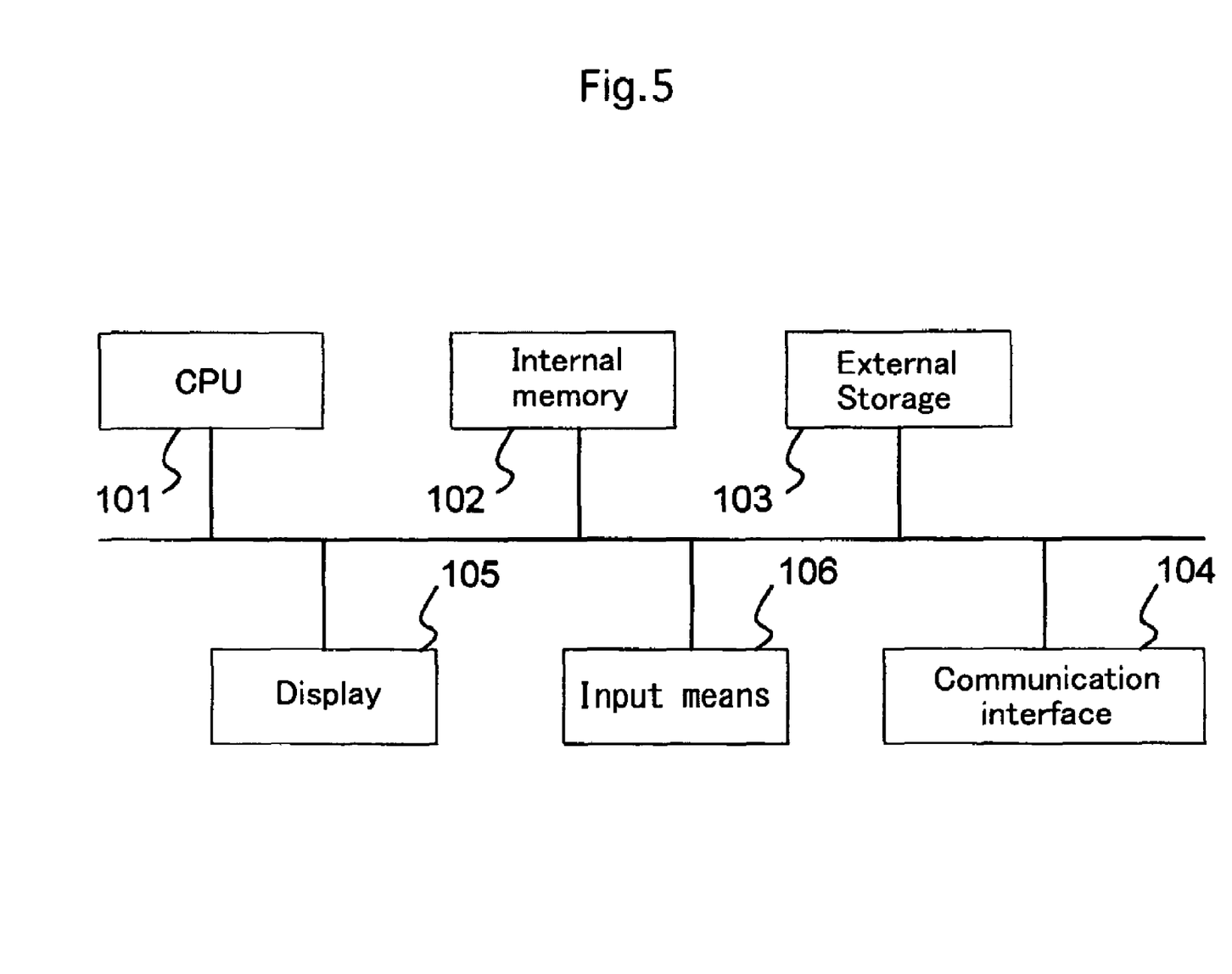
FIG. 5 is a schematic view of the configuration of the internal hardware of the sensor device according to the same embodiment as that of FIG. 1.

The sensor device main unit P1 may be a computer having the general information processing functionality of a personal computer, a workstation or the like, as shown in FIG. 5, comprising: a CPU 101; an internal memory 102; an external storage device 103, such as a HDD or the like; a communications interface 104 for applying electrical power to the sensor elements S and controlling the position of the robot hand RH; a display 105; and input means such as a mouse, keyboard or the like, etc.

Figure 6:
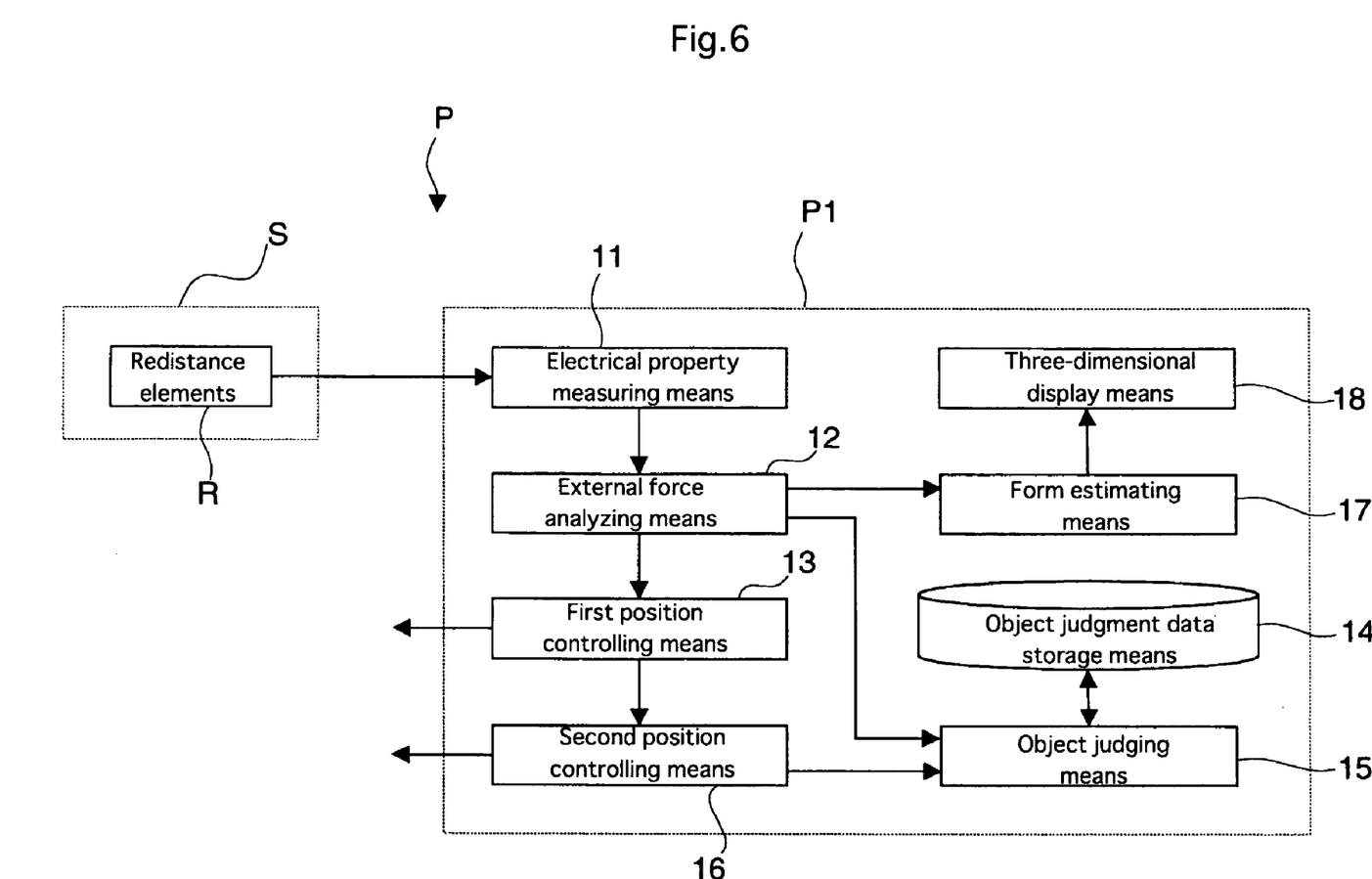
FIG. 6 is a schematic block diagram of the functionality of all hardware of the sensor device according to the same embodiment as that of FIG. 1.

Further, according to the current embodiment, as shown in FIG. 6, the sensor device main unit P1 has installed thereon a predetermined software program for operating the CPU 101, peripheral devices, and so on, whereby the sensor device main unit P1 is provided with the functionality of an electrical property measuring means 11, an external force analyzing means 12, a first position controlling means 13, an object judgment data storage means 14, an object judging means 15, a second position controlling means 16, a form estimating means 17, a three-dimensional display means 18, etc.

More specifically, the electrical property measuring means 11 is a means for measuring the resistance values of the resistance elements R provided on the sensor element S. Note that according to the current embodiment, the resistance value of each of the resistance elements R is measured between the Ra-Rb resistance elements and the Rc-Rd resistance elements of the Wheatstone bridges shown in FIG. 10, whereby the resistance values are measured.

The external force analyzing means 12 is a means for analyzing the external force information such as the magnitude, directionality or the like of the external force F, based on the resistance values of the resistance elements R obtained by the electrical property measuring means 11 by measuring and analyzing the voltages of the resistance elements R. In even greater detail, for example, if the resistance values of the resistance elements RX1 and RX3 rise, and the resistance values of the resistance elements RX2 and RX4 fall, the external force is analyzed to have been applied in a direction such as that shown in FIG. 4b. Still further, if the resistance values of the resistance elements RX1 and RX3 fall, and the resistance values of the resistance elements RX2 and RX4 rise, the external force is analyzed to have been applied in the direction causing the central member C2 to move in the direction opposite to that of the robot hand mounting side.

The first position controlling means 13 controls the three-dimensional position of the contacting means with respect to the object OB, based on the external force information analyzed by the external force analyzing means 12.

The object judgment data storage means 14 is a means for storing object data representing the surface condition or composition of the object OB in the internal memory 102 or in a predetermined region of the external storage device 103. More specifically, for the dynamic friction coefficient of various types of fiber objects OB including wool, linen, and silk, for example, the robot hand RH is moved at a speed of 1 mm/sec applying a load of 50 gf to each object OB to first measure the dynamic friction coefficient; then, the measured dynamic friction coefficient for each of the respective objects OB is stored as a reference dynamic friction coefficient. Note that the object data to be stored in the object judgment data storage means 14 is not limited to dynamic friction coefficients; if the data comprises static friction coefficients or other data representing a surface condition or composition of an object OB, it is not restricted in this embodiment. Further, an embodiment wherein object data is obtained online or on a distributed CD-ROM is also conceivable.

The object judging means 15 is a means for discriminating the surface condition or composition of an object OB, based on the external force information analyzed by the external force analyzing means 12 and the reference dynamic friction coefficients stored as object data in the object judgment data storage means 14. More specifically, the measured dynamic friction coefficient measured with the robot hand RH by moving the robot hand RH at a speed of 1 mm/sec and applying a load of 50 gf to the object OB is compared to a reference dynamic friction coefficient to determine whether or not said measured reference values are within a predetermined relationship; if said values are within the predetermined relationship, the surface condition of the object OB is judged to be the surface condition shown by the reference dynamic friction coefficient.

Figure 7:
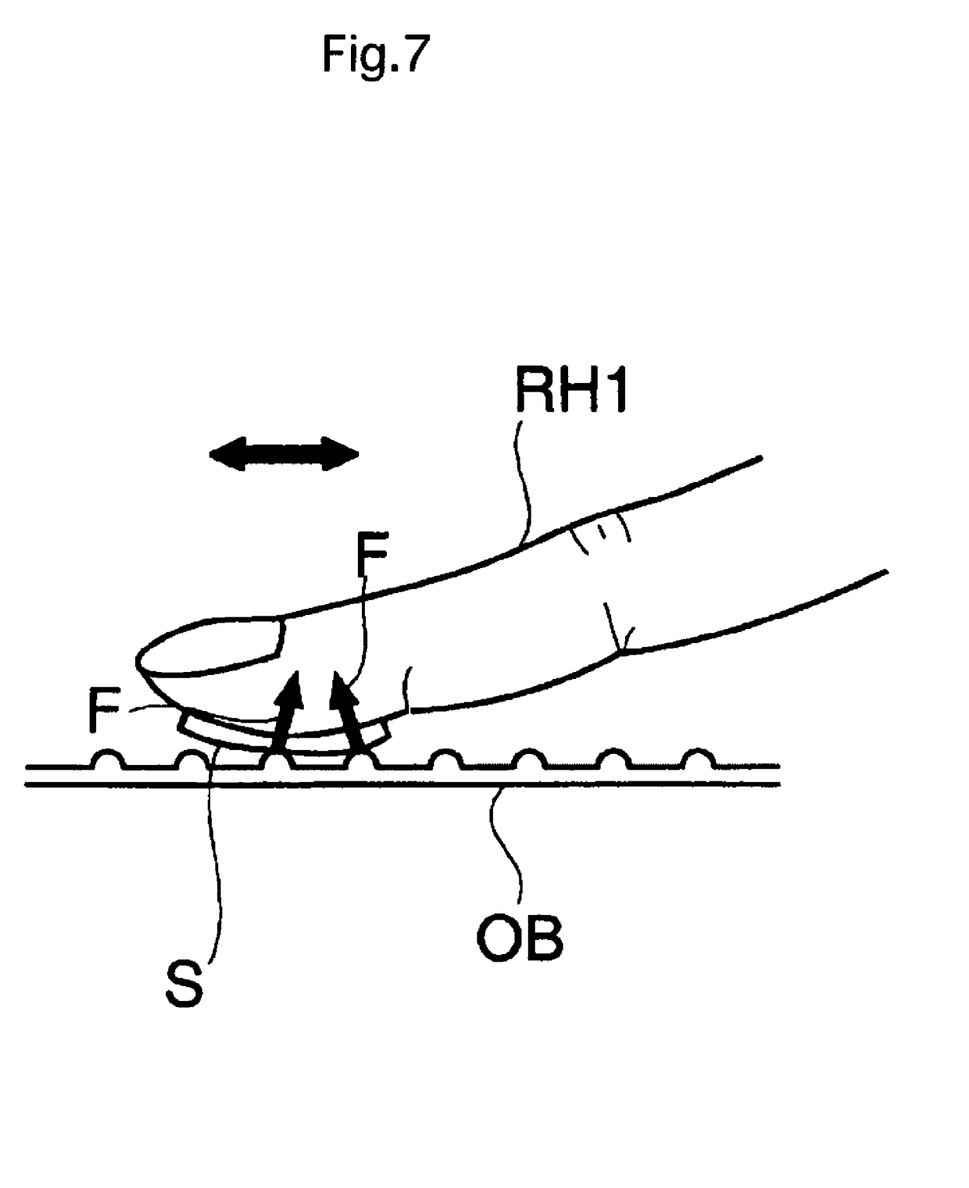
FIG. 7 shows a view of the overall configuration of the sensor device according to an embodiment of the present invention.

The second position controlling means 16, as shown in FIG. 7, is a means for moving the robot hand RH in a predetermined direction while maintaining contact between the sensor elements S and the surface of the object OB. Note that according to the current embodiment, when discrimination of the surface of the object OB is carried out by the object judging means 15, the speed of the robot hand RH is controlled to 1 mm/sec and the load applied by the robot hand RH to the object OB is controlled to 50 gf.

The form estimating means 17 is a means for estimating the form of the elastic member E after the deformation thereof by an external force, based on the external force information analyzed by the external force analyzing means 12.

The three-dimensional display means 18 is a means for displaying three-dimensionally the form of the elastic member E estimated by the form estimating means 17, utilizing the display 105 or the like, based on the changes in the resistance values of the resistance elements R.

Figure 8:
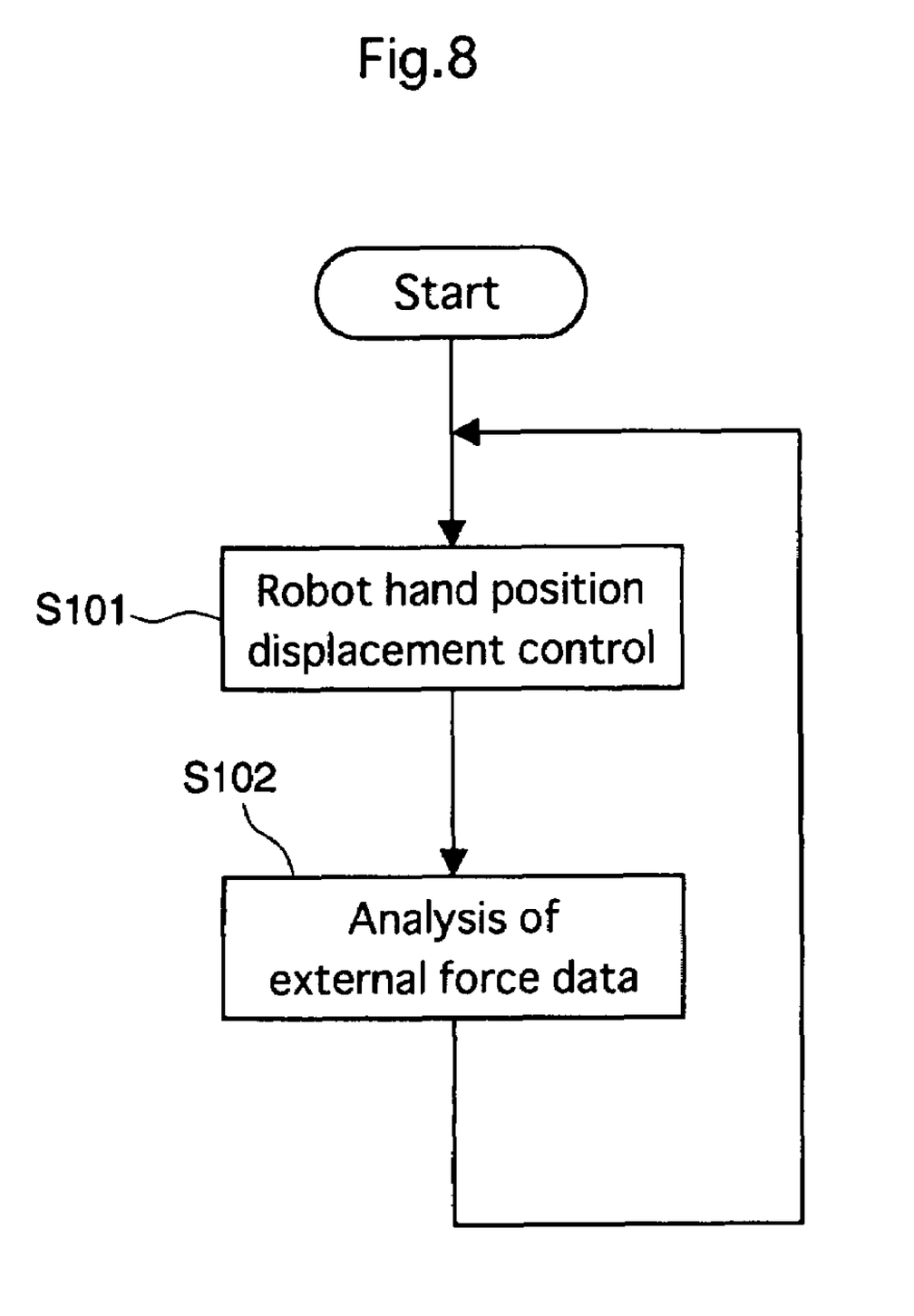
FIG. 8 is a flow chart showing the operation of the sensor device according to the same embodiment as that of FIG. 1.
Figure 9:
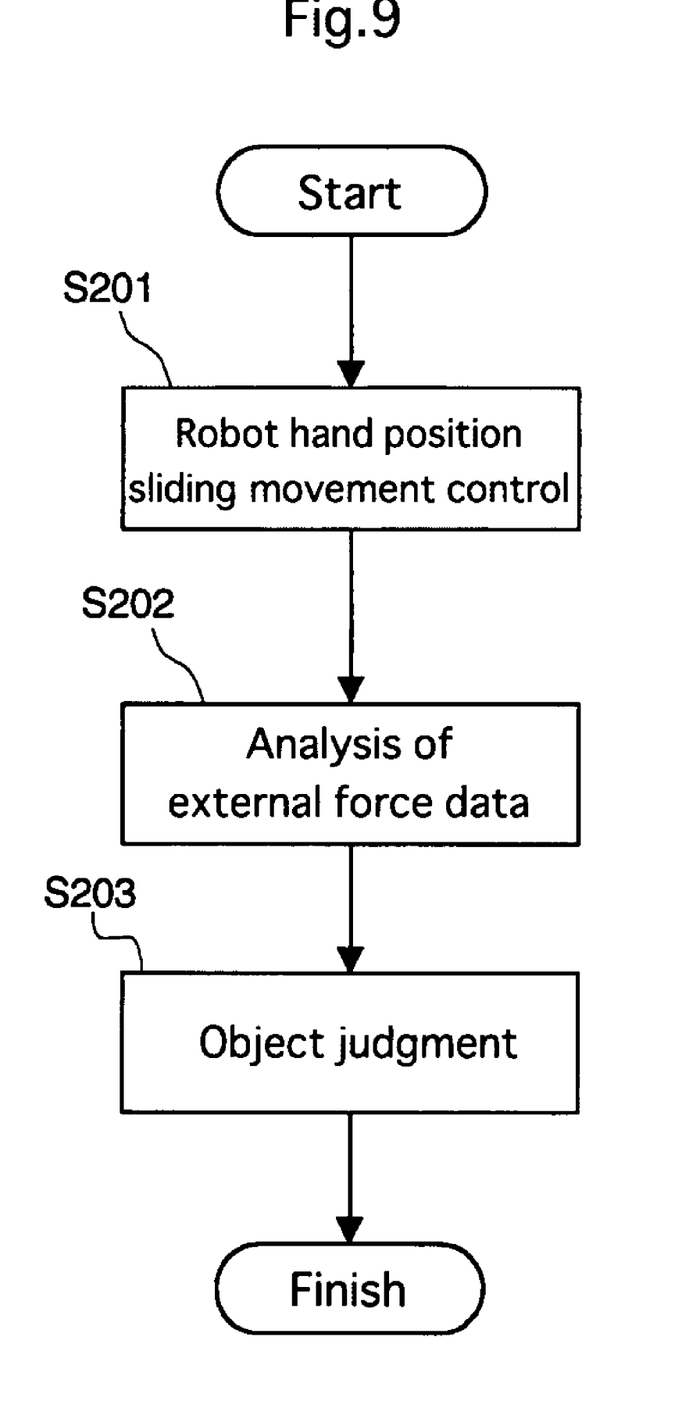
FIG. 9 is a flow chart showing the operation of the sensor device according to the same embodiment as that of FIG. 1.

Next, the operation of the above-described sensor device P will be explained with reference to the flowcharts and the like shown in FIGS. 8 and 9.

The sensor elements S comprised in the sensor device P according to the current embodiment, as shown in FIG. 1, are mounted on the ventral side of the thumb RH1 and index finger RH2 of the robot hand RH and connected to the sensor device main unit P1 by a connector cable (not shown), and will be further explained with regard to the functionality of the sensor device P as a device for controlling the movement of objects.

First, the first position controlling means 13 controls the positions of both of the fingers RH1 and RH2 of the robot hand RH so as to grasp the block serving as the object OB (Step S101) with both fingers of the robot hand RH. Then, when the sensor elements S mounted on the fingertips of the robot hand RH come into contact with the block object OB an external force F is applied thereto, whereby the resistance element R is deformed as shown in FIG. 4b or FIG. 4c, bringing about a change in the resistance thereof. In this manner, if the resistance values of the resistance elements R change, the electrical property measuring means 11 of the sensor device main unit P1 detects the fact that there have been changes in the resistance values. Further, the external force analyzing means 12 analyzes the external force information of the external force F (Step S102), based on the resistance values of the resistance elements R measured by the electrical property measuring means 11. Continuing, the first position controlling means 13 controls the three-dimensional position of the robot hand RH and the fingers RH1 and RH2 with respect to the object OB (Step S101), based on the external force information analyzed by the external force analyzing means 12. More specifically, if the external force received from the object OB is smaller than a predetermined value, for example, the first position controlling means 13 causes the fingers of the robot hand to draw nearer to the object OB; if the force is larger than the predetermined value, the first position controlling means 13 causes the fingers of the robot hand to move away from the object OB. In this way, the control can be performed so as to more closely approximate that of the human grasping movement. And in this manner, the sensor device P can be made to function as an object movement control device capable of appropriately performing grasp control of the object OB.

Further, when said sensor device P is made to function as an object judging means for discriminating the object OB, as shown in FIG. 7, if the sensor S mounted on the tip of the finger RH1 of the robot hand RH is slid across the surface of a fiber serving as the object OB disposed along a horizontal plane, the surface condition or composition of the fiber can be discriminated.

Specifically, first, the second position controlling means 16 of the sensor device main unit P1 slidingly controls the position of the robot hand RH or the finger so as to cause the robot hand RH or the finger to stroke the surface of the fiber (Step S201). This results in the application of an external force F to the sensor element S from the surface of the fiber, as shown in FIG. 4b or 4c, whereby the resistance elements R are deformed, bringing about an accompanying change in the resistance value of each resistance element R.

In this fashion, when the resistance values of the resistance elements R change, the electrical property measuring means 11 of the sensor device main unit P1 detects the fact that there have been changes in the resistance values, and the external force analyzing means 12 analyzes the external force information (Step S202), based on the resistance values measured by the electrical property measuring means 11. Continuing, the object judging means 15 discriminates the surface condition or composition of the object OB, based on the external force information analyzed by the external force analyzing means 12 and reference dynamic friction coefficients stored as object data in the object judgment data storage means 14 (Step S203). In this way, the sensor device P can be made to function as an object judging means for appropriately discriminating the surface condition or composition of an object OB. Further, if the sensor device main unit P1 is made to function so as to include a Step wherein the form of the deformed elastic member E is estimated, based on the resistance values of the resistance elements R measured by the electrical property measuring means 11, and a Step wherein the display means 18 displays the form of the deformed conductive elastic member D estimated by the form estimating means 17 on the display 105, the object OB can be more concretely recognized.

As described above in detail, according to the sensor element S according to the current embodiment, resistance elements R are supported on beam members C3 of a support member C provided in an elastic member E, and a protruding member C4 protrudes from a central member C2 of the support member C; wherein, if an external force is applied in a direction expanding or compressing the sensor element S, the resistance elements R are deformed by the external force F, causing the resistance values of the deformed resistance elements R to rise or fall, whereby the force in three directions can be measured simultaneously if the resistance values are measured. Further, at this time, because the beam members C3 supporting the resistance elements R are surrounded on the periphery thereof by the external wall element C1 that does not become deformed by the external force F, the resistance elements R are appropriately protected from the external force F. In other words, it is possible to provide a sensor element S with excellent damage resistance and shock resistance capable of accurately measuring an external force three-dimensionally awhile being protected from the external force.

Further, if a sensor element S such as that described above is used, it becomes possible to realize an object movement control means capable of appropriately controlling the grasping force applied to an object OB, or an object judging means facilitating appropriate discrimination of the surface condition or composition of an object OB.

Still further, the sensor element S has been described as being mounted on a robot hand RH; however, the sensor element S may be mounted on the object, and the place of mounting the sensor element S or the number of sensor elements S to be mounted can be determined flexibly according to the specific embodiment.

Yet further still, the resistance elements R are configured so as to be supported on the beam members C3 of the support member C; however, as shown in FIG. 3, the resistance elements R can be disposed in the elastic member transformed region B provided in the elastic member E surrounded by the external wall member C1, central member C2 and beam members C3.

Further yet still, the protruding member C4 is configured so that the upper end surface C4f thereof is exposed on the surface Ef of the elastic member E so as to be able to detect the external force F with good sensitivity; however, an embodiment wherein the upper end surface C4f is not exposed is also conceivable.

In addition, if a plurality of units is arranged within the elastic member in the form of an array, a thin, high-performance distributed sensor can be realized.

As will be understood by those familiar with the art, the present invention is not limited to the above-described embodiments; it can be adapted in numerous variations.

The sensor element according to the present invention can be used to realize an object movement control device capable of appropriately performing object grasp control, or an object judging device capable of appropriately discriminating the surface condition or composition of an object.

What is claimed is:

1. A sensor element comprising: an elastic member capable of being compressed or expanded by an external force received from an object, a resistance element whose electrical resistance value rises or falls upon the deformation thereof by an external force, and a support member disposed inside or on the surface of the conductive elastic member and capable of supporting the resistance element in a predetermined position;

wherein the support member comprises a deformable element capable of being deformed by an external force and a non-deformable element incapable of being deformed by an external force disposed around the periphery of the deformable element and a protruding member;

wherein the non-deformable element comprises an external wall member in the form of a four-sided level-surfaced substantially rectangular framework, and the deformable element comprises a central member surrounded by each side of the external wall member and beam members that respectively spans between each side of the external wall member and the central member;

wherein the resistance element is supported on the deformable element; and wherein the protruding member protrudes from the central member in a predetermined direction toward the surface of the conductive elastic member.

2. The sensor element according to claim 1, wherein the resistance element is disposed in the elastic member located adjacent to the support member.

3. The sensor element according to claim 1, wherein a plurality of the resistance elements are arranged thereon to form a Wheatstone bridge circuit.

4. The sensor element according to claim 1, wherein a plurality of the support members is disposed in the elastic member.

5. The sensor element according to claim 1, wherein a plurality of the support members is disposed in an array.

6. A sensor device utilizing the sensor element according to claim 1, said sensor device being a sensor device for analyzing the external force applied to the sensor element, comprising: the sensor element, an electrical property measuring means for measuring the electrical resistance value of the resistance element provided on the sensor element, and an external force analyzing means for analyzing external force information related to the magnitude, directionality or other property of the external force, based on the electrical resistance value measured by the electrical property measuring means.

7. The sensor device according to claim 6, further comprising a form estimating means for estimating the form of the elastic member after the deformation thereof, based on the electrical resistance value measured by the electrical property measuring means.

8. The sensor device according to claim 6, further comprising a three-dimensional display means for displaying three-dimensionally the form of the elastic member estimated by the form estimating means, based on the electrical resistance value.

9. The sensor device according to claim 6, further comprising an object judging means for discriminating the surface condition or composition of the object, based on the external force information analyzed by the external force analyzing means.

10. The sensor device according to claim 9, further comprising an object judgment data storage means for storing object data representing the surface condition or composition of the object; wherein the object judging means can discriminate the surface condition or composition of the object by referencing the object data stored in the object judgment data storage means.

11. An object movement control device utilizing the sensor element according to claim 1, said object control device being a device for controlling movement of an object to a desired position, comprising: a contacting means mounted thereon the sensor element for making physical contact with the object by way of the sensor element, an electrical property measuring means for measuring the electrical resistance value of the resistance element provided on the sensor element, an external force analyzing means for analyzing the external force information relating to the magnitude, directionality or the like of the external force, based on the electrical resistance value measured by the electrical property measuring means, and a first position controlling means for controlling the three-dimensional position of the contacting means with respect to the object, based on the external force information analyzed by the external force analyzing means.

12. The object movement control device according to claim 11 wherein the contacting means has a form imitating that of a human finger.

13. An object judging device utilizing the sensor element according to claim 1, said object judging device being a device for discriminating objects, comprising: a contacting means mounted thereon the sensor element for making physical contact with the object by way of the sensor element, an electrical property measuring means for measuring the electrical resistance value of the resistance element provided on the sensor element, an external force analyzing means for analyzing the external force information relating to the magnitude, directionality or other property of the external force, based on the electrical resistance value measured by the electrical property measuring means, an object judging means for discriminating the surface condition or composition of the object, based on the external force information analyzed by the external force analyzing means, an object judgment data storage means for storing object data representing the surface condition or composition of the object, and a second position controlling means for causing the sensor element to be in physical contact with the surface of the object while the contacting means is moved in a predetermined direction; wherein when the second position controlling means causes the contacting means to be moved while the contacting means maintains the sensor element S in contact with the surface of the object, the object judging means discriminates, the surface condition or composition of the object based on the external force information analyzed by the external force analyzing means.

* * * * *